(12) United States Patent
Bouchier et al.

(10) Patent No.: US 12,282,211 B2
(45) Date of Patent: Apr. 22, 2025

(54) OPHTHALMIC LENS HAVING A HOLOGRAPHIC MIRROR ON A LOW-BIREFRINGENCE BASE LENS

(71) Applicant: Essilor International, Charenton-le-Pont (FR)

(72) Inventors: Aude Bouchier, Charenton-le-Pont (FR); Samuel Archambeau, Charenton-le-Pont (FR); Jean-Paul Cano, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 697 days.

(21) Appl. No.: 17/620,274

(22) PCT Filed: Jun. 19, 2020

(86) PCT No.: PCT/EP2020/067194
§ 371 (c)(1),
(2) Date: Dec. 17, 2021

(87) PCT Pub. No.: WO2020/254631
PCT Pub. Date: Dec. 24, 2020

(65) Prior Publication Data
US 2022/0342235 A1 Oct. 27, 2022

(30) Foreign Application Priority Data
Jun. 21, 2019 (EP) .................................... 19305815

(51) Int. Cl.
*G02C 7/10* (2006.01)
*G02B 27/01* (2006.01)
*G02C 7/14* (2006.01)

(52) U.S. Cl.
CPC ......... *G02C 7/102* (2013.01); *G02B 27/0172* (2013.01); *G02C 7/14* (2013.01); *G02B 2027/0174* (2013.01)

(58) Field of Classification Search
CPC . G02C 7/102; G02C 7/14; G02C 7/08; G02C 2202/16; G02C 2202/20;
(Continued)

(56) References Cited

U.S. PATENT DOCUMENTS

2002/0044352 A1 4/2002 Yamamoto et al.
2004/0080062 A1 4/2004 Pope et al.
(Continued)

FOREIGN PATENT DOCUMENTS

JP 2006-504147 A 2/2006
JP 2019-61232 A 4/2019
(Continued)

OTHER PUBLICATIONS

International Search Report issued on Sep. 10, 2020 in PCT/EP2020/067194 filed Jun. 19, 2020, 4 pages.

*Primary Examiner* — James C. Jones
(74) *Attorney, Agent, or Firm* — Oblon, McClelland, Maier & Neustadt, L.L.P.

(57) ABSTRACT

An ophthalmic lens and a method of manufacturing the ophthalmic lens, the ophthalmic lens including a base lens that includes at least a layer of low-birefringence material and at least one holographic component recorded on a surface of the layer of low-birefringence material, and an auxiliary lens assembled to the base lens.

13 Claims, 4 Drawing Sheets

(58) Field of Classification Search
CPC ........ G02C 7/024; G02C 7/101; G02C 7/108; G02B 27/0172; G02B 2027/0174; G02B 2027/0178; B29D 11/00009; B29D 11/00644; B29D 11/0073; B29D 11/00903

See application file for complete search history.

(56) References Cited

U.S. PATENT DOCUMENTS

| | | |
|---|---|---|
| 2016/0033771 A1 | 2/2016 | Tremblay et al. |
| 2017/0293147 A1 | 10/2017 | Tremblay et al. |
| 2018/0095279 A1* | 4/2018 | Bouchier ................. G02B 5/32 |
| 2018/0173007 A1 | 6/2018 | Puetz et al. |
| 2019/0101761 A1 | 4/2019 | Ihmels |
| 2020/0117023 A1 | 4/2020 | Puetz et al. |
| 2020/0142199 A1 | 5/2020 | Bouchier et al. |

FOREIGN PATENT DOCUMENTS

| | | |
|---|---|---|
| WO | WO 2004/040341 A1 | 5/2004 |
| WO | WO 2013/084177 A1 | 6/2013 |

* cited by examiner

OPHTHALMIC LENS HAVING A HOLOGRAPHIC MIRROR ON A LOW-BIREFRINGENCE BASE LENS

FIELD OF THE INVENTION

The invention relates to an ophthalmic lens comprising a base lens including a layer of low-birefringence material on which is recorded at least one holographic component. The invention also relates to a manufacturing process of such an ophthalmic lens.

BACKGROUND OF THE INVENTION

Head-mounted devices with display features are already well known. Such devices allow the wearer to visualize images or text for augmented reality.

To this end, it is known from document WO2016/156614 a method for providing an ophthalmic lens intended to be fitted onto a frame and worn by a wearer, wherein the lens comprises a holographic mirror which is configured to reflect light generated by an image source integrated in the frame.

The mirror is holographic in that it is recorded using a holography process. More specifically, the holographic mirror is obtained by providing on the ophthalmic lens a film of unrecorded medium, and recording the holographic mirror by generating interferences between at least a reference beam and an illumination/object beam at the holographic medium.

Depending on the configuration of the beams during the recording step, the mirror can be imparted an optical function that is able to modify the wavefront of the light beam stemming from the image source, upon reflection onto the mirror. Thus, the recording can be performed according to the configuration of the lens and the frame, and optionally to some features of the wearer.

The quality of the hologram, and in particular the accuracy of the optical function performed by the holographic mirror, depends on the quality of the interference fringes created to record the optical function. This quality is related to the visibility V of the interference fringes, which is directly linked to the angle $\psi$ between the polarizations of the illumination/object beam and the reference beam:

$$V(\psi) = V_{max} \cdot \cos(\psi)$$

where Vmax is the maximal visibility, ideally 1.

If the substrate medium is homogeneous, and in particular has low birefringence, the angle is only linked to the recording setup, and can be easily optimized. However, if the substrate medium is birefringent, the angle can vary locally due to the material itself, which results in local decreased visibilities of the fringes and hence a poor-quality and homogeneity of the holographic mirror.

Another issue of the recording of holographic mirrors on lenses is the complexity of manufacturing such lenses at high scale. Indeed, the holographic recording may depend on the lens characteristics, for instance the lens power, the type of head-mounted device in which the lens is integrated etc., which implies adapting the configuration of each holographic component and hence the configuration of each recording optical set-up to the lens characteristics. This induces complexity and high cost in the manufacturing process.

SUMMARY OF THE INVENTION

The purpose of the present disclosure is to provide a solution to the defects in the prior art.

In particular, one aim of the present disclosure is to provide a way to manufacture lenses including holographic components in a cheaper, quicker way, and whatever the optical characteristics of the lens, for instance in terms of refraction index, transmission, birefringence, absorption filtering, power (including progressive optical power), etc.

The above-mentioned purpose is achieved by a combination of the characteristics described in the independent claims, and subordinate claims provide for specific advantageous examples of the invention.

An ophthalmic lens and a method for manufacturing the same are disclosed.

The ophthalmic lens according to an embodiment of the present disclosure comprises a base lens including a layer of low-birefringence material on which is recorded a holographic component, and an auxiliary lens assembled to the base lens. Thanks to the layer of low-birefringence material, it is possible to obtain a high-quality and efficient holographic component. The auxiliary lens may then provide any desired function, whether mechanical and/or optical, by merely assembling the auxiliary lens to the base lens. In particular, the auxiliary lens can be made of a high-birefringence material without prejudice to the manufacturing cost or complexity of the holographic mirror.

For instance, the base lens may be a plano lens, i.e. devoid of any power, and the auxiliary lens may have an optical power corresponding to the power of the final lens. In embodiments, the base lens and/or the auxiliary lens may incorporate optical functions. In particular, incorporating a polar/photochromic/tint function at the front surface of the base lens while the holographic component is at the back surface thereof may allow increasing virtual image contrast, since light from the environment is reduced while light coming from a display and reflected by the mirror is not reduced, which is particularly suitable for augmented reality applications.

DESCRIPTION OF THE DRAWINGS

For a more complete understanding of the description provided herein and the advantages thereof, reference is now made to the brief descriptions below, taken in connection with the accompanying drawings and detailed description, wherein like reference represent like parts.

DETAILED DESCRIPTION OF AN EMBODIMENT OF THE INVENTION

Definitions

Figure 1:
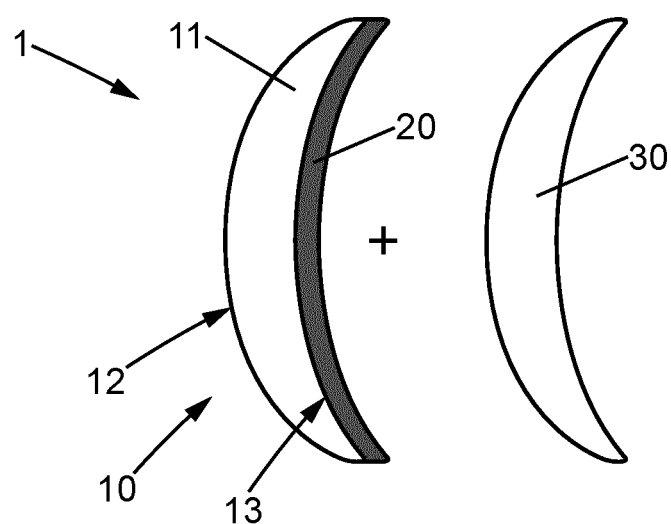
FIG. 1 depicts a first example of an ophthalmic lens.

The following definitions are provided to describe the present disclosure.

"Holographic mirrors" (HM) are known in the art. A mirror is defined as a holographic mirror if it was recorded using a holography process. This mirror is used to reflect a light beam generated by an image source, which can be for instance a display screen, a picoprojector, etc., towards the eye of a wearer, so as to cause visualization of the image by the wearer. The holographic mirror is not used to reconstruct a recorded holographic image as is the case in traditional hologram viewing.

According to the recording configuration, the mirror can be imparted an optical function that is independent of the geometry of the layer supporting the holographic mirror. For instance a holographic mirror may have a focal distance or not, comprise one or several zones of different functions or reflecting different wavelengths, have a determined power, etc.

A "holographic filter" is an optical filter recorded on a support with a holography process. Such filter can let through one wavelength or a range of wavelengths, in a particular direction.

A "holographic lens" is a lens which is recorded on a support thanks to a holography process. It can operate for a given wavelength or in a range of wavelengths in order to focalize light in a given direction or at a given position. On a same support a holographic lens may be configured to exhibit spectral and/or angular selectivity, have different zones of different focal distances and different spectral or angular selectivity.

A "holographic deflector" is a holographic component that directs incoming light towards a different direction from the direction followed by the incoming light.

A "Fourier hologram" is a hologram comprising an image which can be read by an external source, either in transmission or in reflection, thereby allowing manufacturing compact displays, for applications of augmented reality, optometry or orthoptics.

A "edge-lite hologram" is a hologram allowing guiding of light within a thin layer, for instance for proper sensor, display or filter integration.

In all that follows, a holographic component can refer to any one of a holographic mirror, a holographic filter, a holographic lens, a holographic deflector, a Fourier hologram or a edge-lite hologram.

The recording of a holographic component on a support is performed with an optical arrangement, which comprises a light source, for instance a laser, emitting a light beam. Usually, a polarization beam splitter allows splitting the beam into two beams: one reference beam and one illumination beam, both beams illuminating the holographic medium on the same side or on opposite sides depending on the type of holographic component. Interferences caused by the reference beam and illumination beam on the holographic recording medium allow recording the holographic component. The configurations of the reference beam and the illumination beam allow adapting the function and configuration of the holographic component. For instance in the case of holographic mirrors, once the optical arrangement is set (e.g. geometry, sizes of the beams, etc.), features of the holographic mirror can be modified by varying one or more parameters, including the power ratio between the two beams (impacts the fringe contrast and the diffraction efficiency), the exposure time (impacts the diffraction and diffusion efficiency), and the possible use of rotatable supports on which are positioned polarization maintaining fibers through which the reference beam and illumination beam are transmitted (impacts the polarizations of the beams when exiting the fibers). It may be noted that a plurality of reference beams and/or illumination beams may also be used to record the holographic component. The skilled person may refer to document WO 2016/156614 for more details about the recording setups used to achieve desired holographic component configuration.

"Head-mounted display devices" (HMD) are known in the art. Such devices are to be worn on or about the head of a wearer, including helmet-mounted displays, optical head-mounted displays, head-word displays and the like. They include optical means for displaying an image for visualization by the wearer. The HMD may provide for the superimposed visualization of a computer generated image and a "real-life" vision field. The HMD may be monocular (single eye) or binocular (both eyes). An HMD incorporating a lens according to the present disclosure can take various forms, including eyeglasses, masks such as skiing or diving masks, goggles, etc. The HMD comprises one or more ophthalmic lenses. In preferred embodiments, the HMD is a pair of eyeglasses provided with ophthalmic lenses, which can be solar lenses.

"Image sources" (IS) are known in the art. An image source is any light source than can emit a light beam suitable for displaying the image for visualization by the wearer. Visualization occurs after the illumination beam stemming from the image source is reflected onto the holographic mirror. In embodiments of the present disclosure, the IS is typically off-axis, in that it can be located next to the temple of the wearer, for example on a temple component of a HMD, such as a temple component of spectacles. In embodiments of the present disclosure, the IS may be any image source configured for the display of virtual images (computer-generated images). It may be a screen (for instance OLED, LCD, LCOS, etc.), a phase and/or amplitude SLM (Spatial Light Modulator), taken in combination with its light source (for example laser, laser diode, etc.), a projector such as a picoprojector (MEMS or DLP, that may use LEDs, diodes, lasers, etc.) or any other source. The IS may also include any other image source (computer-generated image source) and/or control electronics and/or power supply and/or optional optical elements, etc.

Ophthalmic Lens

Figure 2:
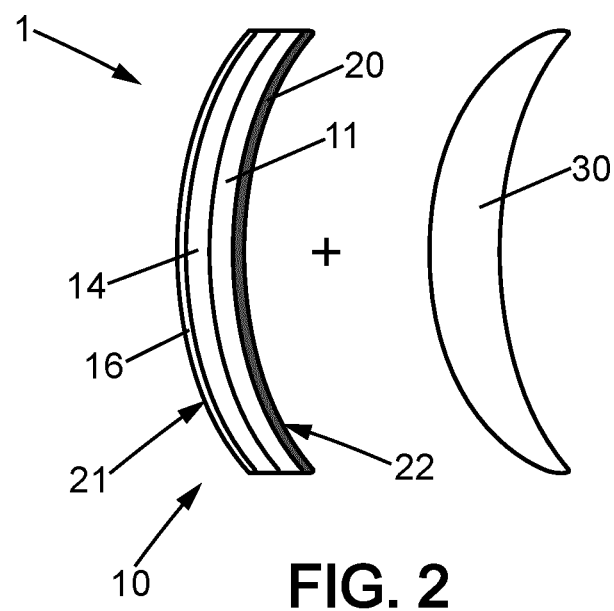
FIG. 2 depicts a second example of an ophthalmic lens.
Figure 3:
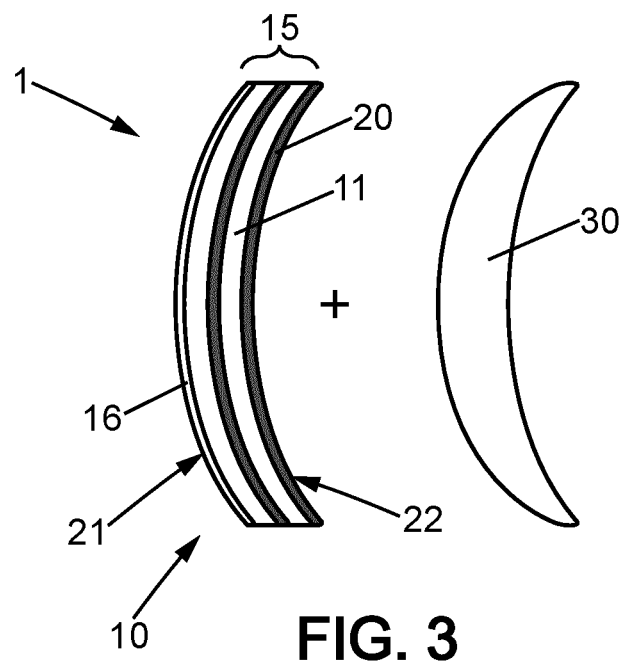
FIG. 3 depicts a third example of an ophthalmic lens.

With reference to FIGS. 1 to 3, an ophthalmic lens 1 according to embodiments of the present disclosure will now be described.

The ophthalmic lens 1 comprises a base lens 10 comprising a layer 11 on which is recorded a holographic component 20, and an auxiliary lens 30 assembled to the base lens 10.

Figure 4:
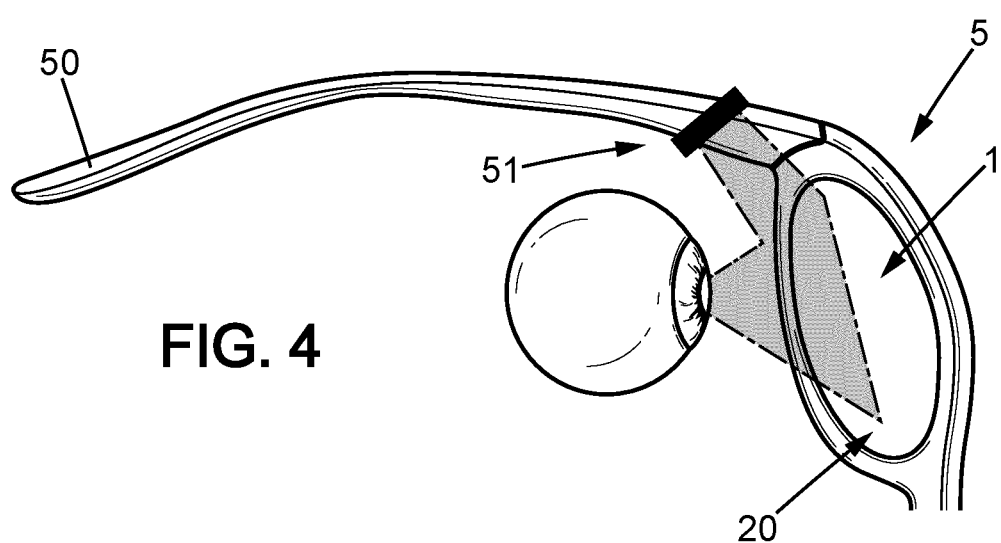
FIG. 4 schematically represents an optical device in which is inserted an ophthalmic lens.

As shown schematically in FIG. 4, according to an embodiment, this ophthalmic lens 1 is adapted to be fitted into a Head-Mounted Display device HMD 5 comprising a frame 50 in which a built-in image source 51 is positioned. In this embodiment, the holographic component 20 can comprise a holographic mirror. The image source 51 is in that case configured for illuminating said holographic mirror and to cause, upon reflection onto said holographic mirror 20, the visualization of a virtual image by the wearer which is superposed to the real vision of the wearer's environment. For ametropic wearers, the ophthalmic lens 1 is adapted to correct both the wearer's virtual vision (vision of the image generated by the image source) and the real vision (vision of the environment of the wearer).

A particular application is augmented-reality equipments in which an optical conjugation is implemented between the eye pupil and the image source. In this configuration, the HMD 5 may comprise a movable micro mirror interposed between the image source and the lens, and moving according to the position of the eye pupil in order to follow the eye pupil's motion. Furthermore, in this configuration, the holographic mirror recorded in the lens is configured to implement optical conjugation between the image source and the pupil. Given the very short distance between the holographic mirror and the pupil, this implies that the mirror has important power, for instance in the range of +40 D to +60 D.

Another possible application is an imaging system in which there is no conjugation with the eye pupil but instead the image source is located near the focal point of the holographic mirror and the holographic mirror is configured to send the virtual image to infinity.

The base lens 10 of the ophthalmic lens 1 is at least partially transparent. It can be planar, curved, spherical, cylindrical, or totally free-form. The outer shape of the base lens can be free-form, circular, squared, etc. The auxiliary lens can be planar, curved, spherical, cylindrical or totally free-form. The outer shape of the auxiliary lens can be free-form, circular, squared, etc.

The layer 11 of the base lens 10 is made of a low birefringence material, to allow recording of a high quality holographic component 20. As mentioned above, the visibility V of interference fringes created to record an optical function depends upon the angle L between the polarizations of the illumination beam and reference beam. A birefringent material comprises intrinsic changes of polarizations reducing the visibility of the interference fringes along the surface of the recorded layer.

It is here considered that a material having low birefringence is a material for which the visibility of the fringes over the surface of the layer of material is at least 80% of the maximum visibility Vmax, which corresponds to a variation of the angle ψ from about 0 to 38°, which in turn corresponds to less than the width of one fringe, with a bright fringe corresponding to parallel polarization states and a dark fringe corresponding to perpendicular polarization states.

The following materials have low-birefringence and are suitable for forming the layer 11 of the base lens on which is recorded the holographic component:
  Thermosetting polythiourethane resins marketed by Mitsui Toatsu Chemicals Company under the tradenames of MR-7™ and MR-8™,
  Allyl diglycol carbonate (ADC) also known as CR-39, or marketed by Essilor under the tradename Orma®,
  Cellulose triacetate (TAC),
  1.74 refraction index material,
  Mineral glass On the other hand, the auxiliary lens 30 can comprise at least one layer of high-birefringence material since it is not necessary to record a holographic mirror on it. For instance, the auxiliary lens may be formed of polycarbonate. However the auxiliary lens 30 may also be formed of low-birefringence material, or of various layers, some of which being highly birefringent and others being of low birefringence.

According to an embodiment, the layer 11 of low birefringence material has no optical power, and hence provides no correction to the wearer. The ophthalmic lens 1 may have a determined power. In that case, the power may be provided by the auxiliary lens 30. The ophthalmic lens 1 may also provide no optical power. In which case the auxiliary lens 30 may be a plano lens, i.e. a lens devoid of optical power, but which is used to increase the mechanical properties of the base lens 10 (if the latter is very thin, for instance less than 1 mm thick) and/or provide at least one optical function to the ophthalmic lens.

Even if the layer 11, and possibly the whole base lens 10, and possibly the auxiliary lens 30 have no optical power, they may however have curved surfaces to provide good aesthetism. According to a non-limiting example, the layer 11 of low birefringence material includes a front surface 12 and a back surface 13, and both surfaces may be spherical, and hence having no optical power.

According to another embodiment, the layer 11 of low birefringence material may include optical power. The auxiliary lens 30 can be configured to provide a power complementary to that of the layer 11 of low birefringence material to obtain the desired power of the lens 1.

On the example shown on FIG. 1, the base lens 10 only comprises the layer 11 of low birefringence material and the holographic component 20 recorded on the latter. The holographic component 20 may be recorded on either the front surface 12 or the back surface 13 of the layer 11, forming respectively the front surface or back surface of the base lens 10 if the base lens 10 only comprises said layer 11. The auxiliary lens 30 may be assembled to the base lens 10 either on a front surface or, more preferably, a back surface of the latter.

In embodiments, some examples of which are shown in FIGS. 2 and 3, the base lens 10 and/or the auxiliary lens 30 is adapted to provide at least one optical function, such that an amplitude filtering function, a spectral filtering function (such as edgepass such as shortpass or longpass, or bandpass filtering, or filtering of specific colors, for instance by tinting, or incorporating photochromic or electrochromic functions), or a polarization function.

To provide said optical function, the base lens 10 and/or the auxiliary lens 30 may comprise more than one layer. For instance, if the base lens provides an optical function, the optical function can be implemented either by the layer 11 of low birefringence material (for instance, the layer 11 may be tinted in order to provide a solar/anti-UV protection) or by at least one additional layer 14 assembled to the latter, or in combination by the layer 11 and an additional layer 14.

In that case, the relative position of the holographic component 20 and the additional layer 14 of the base lens 10, and the position of the auxiliary lens 30 (i.e. assembled to a front or back surface of the base lens 10) may be determined according to the optical function provided by the additional layer and/or the auxiliary lens 30.

According to a non-limiting example, if the optical function is one of a polarization function, a photochromic function, or a filtering obtained by a tinted layer, the holographic component 20 may preferably be recorded on the back surface 13 of the layer 11, while the optical function is implemented on a front side of the holographic component 20, either by the layer 11 itself or by an additional layer 14 is assembled to the layer 11 of low birefringence material on the front surface 12 thereof. This allows that, when the ophthalmic lens 1 is incorporated in a frame having an image source, the optical function implemented by the additional layer or the layer 11 itself be only applied on the light incoming from the "real-life" vision field and not on the light coming from the image source and then on the light reflected on the mirror. Therefore there is no need to adapt the configuration of the holographic mirror to take into account the impact of the optical function. Furthermore, in this case the presence of polar/photochromic/tint function enhances the contrast of the virtual image since light coming from the environment is reduced while light coming from the virtual source is not reduced.

In that case also, the auxiliary lens 30 may be assembled on the back surface of the base lens 10 (which is the back surface of the layer 11 if the additional layer 14 is assembled to the front surface of the layer 11).

A first example of optical function that can be provided by the base lens 10 or auxiliary lens 30 is the fact of being at least partially tinted. Either the layer 11 or an additional layer 14 of the base lens 10, or a layer of the auxiliary lens 30 can be formed of a tinted material, such as for example a material including a blue cut function, as disclosed in document WO2018/054984. The layer 11, or an additional layer 14, or a layer of the auxiliary lens 30 may also include UV absorbing dye (such as the dyes marketed by BASF under the tradenames of TINUVIN® 477 or 479). If the holographic component 20 is recorded on the back surface of the layer 11 of low-birefringence material, the provision of a UV absorbing dye reduces the amount of UV reaching the holographic component, which reduces the yellowish aspect that such component can have.

With reference to FIG. 2, according to another example, the base lens 10 comprises an additional photochromic layer 14 such as a photochromic polyurethane layer 14. In another embodiment, the auxiliary lens 30 may comprise such a photochromic layer.

According to another example shown in FIG. 3, the base lens 10 can comprise a polarizing cell 15. The polarizing cell 15 typically comprises two layers of low birefringence material between which is positioned a polarizing film. In this case, the layer of low birefringence material 11 on which is recorded the holographic component 20 can be one of the two layers of low birefringence material of the cell.

For instance, the polarizing cell can be formed of a stack of three layers of TAC-PVA-TAC (PVA standing for Poly-Vinyl Alcohol), in which case one of the TAC layers can also form the layer 11 of low birefringence material on which is recorded the holographic component 20. The polarizing cell 15 can also be formed of a stack of three layers of PC-PVA-PC (PC standing for Polycarbonate). As PC is a high-birefringence material, the base lens 10 in that case comprises the layer 11 of low birefringence material assembled on the cell 15, and not forming part of the latter. According to another example, not shown, the auxiliary lens 30 may comprise such polarizing cell 15.

According to still another example, the base lens 10 or auxiliary lens 30 can comprise an electrochromic cell (not shown).

Last, at least one of the base lens 10 and auxiliary lens 30 may comprise a coating 16 on an outer surface thereof, such as an abrasion-resistant coating (also known as Hard Multi-layer Coating) and/or an anti-reflection coating. In the case where the holographic component 20 is recorded on a back surface of the layer 11 of low birefringence material, said surface preferably forms the back surface 22 of the base lens 10 and a coating 16 is preferably deposited on the front surface 21 of the base lens. An additional coating 16 may also be provided on the back surface 22 of the base lens 10, over the holographic component 20. An intermediate additional layer can be provided between the holographic component and the coating 16.

If the coating is an anti-reflection coating, the coating may be deposited before the recording of the holographic component 20, in order to enhance the quality of the recording and protect the holographic component.

According to another embodiment, the holographic component 20 may be recorded on a front surface of the layer 11 of low birefringence material, said holographic component 20 forming a front surface of the base lens 10 or being covered by an additional layer, and the base lens 10 can comprise a coating at a front surface thereof, and possibly also at the back surface thereof.

In embodiments, such as in the examples shown in FIGS. 2 and 3, the base lens 10 may comprise more than one additional layer 14, in order to provide a desired function or more than one function. At least one additional layer may for example be a photochromic layer 14 or a polarizing cell 15, and at least one other layer 16 may be include one or more coatings (abrasion-resistant, anti-reflection coating, etc.). The auxiliary lens 30 may also comprise one or a plurality of layers to achieve a number of desired optical functions.

The holographic component 20 recorded on a surface of the layer 11 of low birefringence material is configured to provide at least one optical function, such as a mirror function, filtering function, and so on. According to an example, the holographic component 20 may be a holographic filter. According to another example, the holographic component 20 may be a holographic mirror, further including a filtering function. For instance, the holographic mirror 20 may be configured to reflect light only in a specific range of wavelengths, such as blue light, red light or green light. If the holographic component is a mirror, it may be curved and off-axis to reflect a specific range of wavelengths issued from an image source of a HMD. In that case, the type of reflected wavelengths may depend on the image source. The mirror may also be a planar mirror configured to reflect wavelengths from the real field of vision of the wearer. The holographic mirror 20 may also provide a desired power, such as in the example given above in which the holographic mirror provides optical conjugation between an image source of an HMD and the pupil of the wearer.

The holographic component 20 may also incorporate a function of an optical waveguide, etc.

As indicated above, the holographic component 20 is recorded by making interferences on a film of holographic recording material between at least a reference beam and an illumination beam. In embodiments, it is possible to keep a same setup for recording the holographic component for a given base lens geometry, whatever is the final lens. This is for instance the case if the holographic component is a holographic filter. In this case, the recording may be performed before or after the auxiliary lens is assembled to the base lens.

In other embodiments, it is possible to adapt the setup for recording the holographic component 20 according to the configuration of the final lens 1. For instance, for augmented reality applications, with the holographic component being a mirror, the setup for recording the holographic mirror may be adapted according to the final lens power. In this case, the auxiliary lens 30, if it provides optical power and is made of a low birefringence material, is preferably assembled to the base lens 10 during the recording of the holographic mirror. To the contrary, if the auxiliary lens 30 is made of a high birefringence material, the auxiliary lens may be replaced by an equivalent lens made of a low birefringence material. The setup may also depend on the position of the holographic component within the final lens, i.e. if the holographic component is assembled on a back or front surface of the base lens, and if the auxiliary lens 30 is assembled at the back or front surface of the base lens.

In embodiments, the layer 11 can comprise a plurality of holographic components 20 recorded thereon. As a first example, different filters or mirrors adapted to filter or reflect different ranges of wavelengths may be provided on the layer 11 of low birefringence material. In this case, the components 20 are preferably recorded on the same side of the layer 11. In another example, the layer 11 of low birefringence material comprises on a first side thereof (back surface) a first off-axis holographic mirror configured to reflect light in a range of wavelengths emitted by a display or image source, and the layer 11 can further comprise on a second side (front surface) a second holographic mirror, such as a plane mirror for example, to avoid that the light which has not been reflected by the first mirror can be seen by the conversation partner of the wearer.

Manufacturing Method of an Ophthalmic Lens

Figure 6:
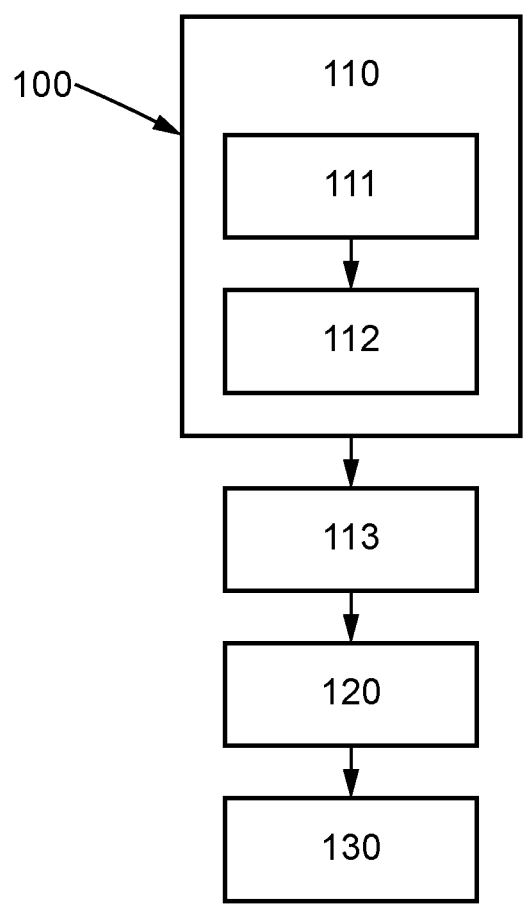
FIG. 6 schematically shows the main steps of an exemplary embodiment of a method of manufacturing an ophthalmic lens.

With reference to FIG. 6, the main steps of a manufacturing method 100 of an ophthalmic lens 1 according to the above description will now be described.

This method comprises a step 110 of forming a holographic component 20 on a layer 11 of low birefringence material, which comprises a substep 111 of depositing a film F of holographic material on a main surface of a layer 11 of low birefringence material. The layer of low birefringence material 11 may have previously undergone a thermoforming step in order to provide a desired curvature.

Holographic materials are known in the art. Such materials include dichromated gelatins and photopolymers. A non-limiting example of suitable photopolymer is marketed by Polygrama under the tradename of SM-TR™. The holographic material can be deposited by polymer jetting, spray coating, dip coating or by spin coating. It can be deposited on the front surface or the back surface of the layer 11 of low birefringence material, over the whole surface or only a specific area, for instance by pad printing. In the case of dip coating, the holographic material is deposited on both main surfaces of the layer 11, and one of the films can be removed later.

Step 110 then comprises insolating 112 the film of holographic material while exposing it to a holographic setup, in order to effectively record the holographic component. With reference to FIGS. 5a to 5d, the recording of a holographic component is performed by generating interference between a reference beam RB and an illumination beam IB, on the film F of holographic material. The two beams are coming from the same source S to allow interferences between the beams. The aperture, orientation of the beams, distance between the beams, the wavelength of the source and the number of beams (at least two although it can be more) allow the definition of the recorded optical function. In particular, the spatial configuration of the reference beam reflects the spatial configuration implemented for illuminating the holographic component once the lens is fitted into a frame (orientation, distance, breadth—i.e. shape and size of the zone projected on the lens, etc.).

The recording setup may be configured such that at least one of the reference beam RB and the illumination beam IB propagates through the layer of low birefringence material before reaching the film of holographic material. As mentioned before, the use of a low-birefringence layer as support of the holographic component provides a better quality for the recorded holographic component compared to the use of a layer of birefringent material in that the visibility of the fringes is increased.

However, due to the reflection of one of the beams on the interface between the holographic material and the layer of material supporting the holographic material, some parasitic reflections may occur which produce parasitic holograms. This is also the case when the recording setup is configured such that the reference beam RB and the illumination beam IB do not propagate through the layer of low birefringence material before reaching the film of holographic material.

The use of a layer of low birefringence enables to use an antireflection coating that may be designed for a particular polarization, which may be more efficient and easier to design than an antireflection coating designed for two perpendicular polarizations as would be the case when the layer of material supporting the holographic material is birefringent.

Additionnally, the parasitic reflections may also be more easily reduced by choosing a configuration in which at least one of the reference and illumination beam incomes on the holographic material with an angle close to the Brewster angle with the proper polarization. The light emitted by the light source S (typically a laser) is guided to the layer 11 of low birefringence material, for instance by optical fibers, which can include single-mode fibers, and preferentially polarization-maintaining (PM) single-mode fibers, large core area fibers and preferentially PM large core area fibers. A beam splitter is used to split the beam into the reference beam and the illumination beam.

One or more lenses selected from unifocal lenses, multifocal lenses such as bifocal lenses and progressive addition lenses, may be used, as well as optionally a planar mirror, for example, to shape the illumination beam and reference beam according to the configuration of the holographic component that is to be recorded. Other means may be used to shape the illumination beam and/or the reference beam such as lenses with varying focal lengths, spatial light modulators and adaptive mirrors for example. This configuration preferably takes into account:

wearer's data, in order to fit the lens and holographic component to the wearer. They include for example interpupillary distance, eye rotation center position, prescription, functional preferences, etc. This list is not exhaustive.

Frame data, including the geometry of the frame (position of the branch carrying the image source relative to the lens, size of the lens), the possible accessories embedded therein such as an eye-tracker, etc. This list is not exhaustive.

Auxiliary lens data, including the power of the lens and its optical characteristics (refractive index, transmission, diffusion etc.), etc. This list is not exhaustive.

Base lens data, including the configuration of the base lens (functions embedded therein), and its optical characteristics, etc. This list is not exhaustive.

Display data: type of display (screen such as OLED, LCD, LCOS, light sources, coherent or not such as LED, laser, diode lasers, OLED, combination of a source and a screen), presence of optical systems active or passive to project the image with desired specifications (collimator, focus, deflectors, and so on), geometrical dimensions of the display, physical features of the display (bandwidth for example), etc. This list is not exhaustive.

In some embodiments, in which the holographic component 20 is a mirror configured to reflect a virtual image generated by an image source of a HMD, the optical arrangement for the recording is configured such that:

The reference beam RB simulates a beam of the image source to be used for illuminating said holographic component so as to cause the display of the virtual image to be visualized by the wearer when wearing the frame, and The illumination beam IB is configured so as to define:
      A distance of visualization of the displayed virtual image by the wearer when wearing the frame, and/or
      A direction of visualization of said displayed image by the wearer when wearing the frame, and/or
      a number of areas of the holographic mirror for the visualization of said displayed virtual image by the wearer when wearing the frame.

Figure 5A:
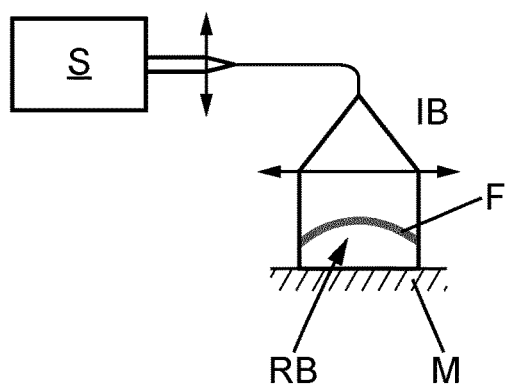
FIGS. 5a to 5d schematically show various optical arrangements for recording a holographic mirror.

Exemplary embodiments for the recording of the holographic mirrors intended to be used on a HMD are shown in FIGS. 5a to 5e. FIG. 5a presents a setup used to record a planar mirror. In this case the reference beam RB is the illumination transmitted beam reflected by a planar mirror M placed after the layer 11.

Figure 5B:
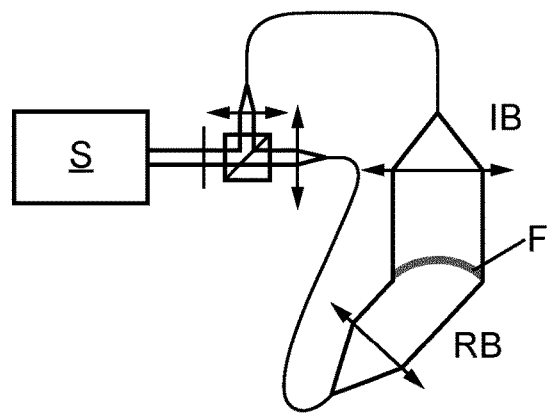

FIG. 5b presents the setup used to record an off-axis planar mirror. In this case, the illumination beam IB is a collimated beam and the reference beam RB another collimated beam arriving from an off-axis position which corresponds to the later position of an image source IS relative to the holographic mirror. This implementation is suitable for a light source that is a SLM (spatial light modulator) or a light field display LFD.

Figure 5C:
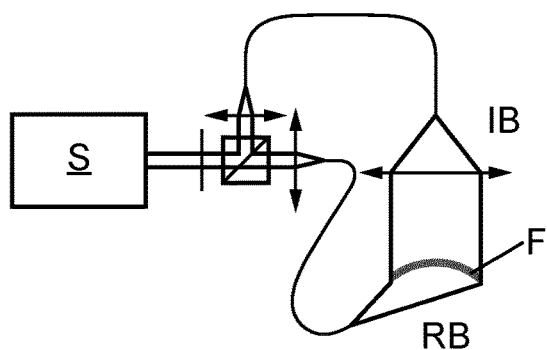

FIG. 5c presents the setup to record an off-axis curved mirror. In this case the illlumination beam IB is a collimated beam and the reference beam RB has for example the characteristics of the display or image source and arrives on the film F with the desired position, focus and angle. This implementation is suitable for HMDs comprising screens as image sources and/or requiring optical conjugation between the pupil and the image source.

Figure 5D:
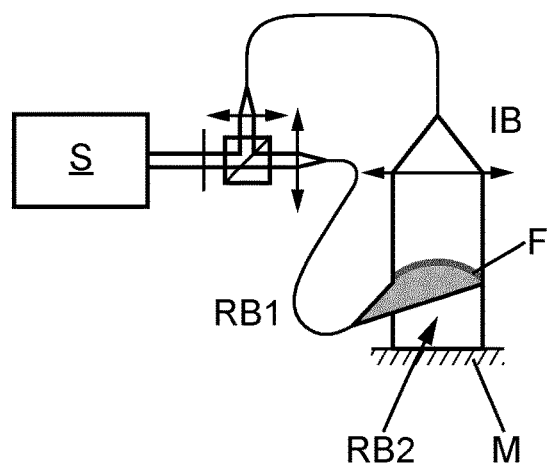

FIG. 5d presents a setup to record both an off-axis mirror for the visualization of a display or image source, and a confidentiality filter for external viewer. In that case the illumination beam IB is a collimated beam, a first reference beam RB1 has the characteristics of the display and image source and arrives on the layer 11 with the desired position, focus and angle, and a second reference beam RB2 is the illumination collimated beam reflected by a planar mirror M placed after the layer 11.

Other setups could be formed for other types of optical functions.

According to an embodiment, the base lens 10 is formed only by the layer 11 on which the holographic component is recorded. According to another embodiment, the base lens 10 further comprises at least one additional layer 14 and/or additional coating 16.

The manufacturing 100 of the lens 1 thus optionally also comprises a step 113 of assembling the layer 11 of low birefringence material to any additional layer 14, for instance in order for the base lens 10 to incorporate other optical functions such as the ones listed above (for instance tint, photochromic, electrochromic, polar function etc.). This step can be performed differently according to the type of function that is incorporated in the additional layer (for instance coating may be performed by dipping, spin coating, etc.).

The order of implementation of steps 110 and 113, can vary according to the function that is implemented in the base lens.

According to a first embodiment, step 113 of assembling the layer 11 of low birefringence material to an additional layer 14 (which can include a photochromic or an electrochromic cell 15 or a layer thereof) may be implemented prior to recording 110 the holographic component. This can be the case for instance if the additional layer is a layer providing a polarization, photochromic, electrochromic, or a filtering function, in augmented reality applications. In that case the additional layer is preferably provided on a front surface of the layer 11, prior to the recording of a holographic mirror, in order to enhance the contrast between the virtual image coming from the image source of the HMD and the image coming from the environment of the wearer.

According to another embodiment, step 113 may be performed after the recording 110 of the holographic component.

The method also comprises a step 120 of assembling the layer 11 of low birefringence material to an auxiliary lens 30. This assembling 120 can be performed by gluing, casting, clipping, by additive manufacturing, for instance by directly depositing voxels of material forming the auxiliary lens 30 on the base lens.

In another embodiment, step 120 may be performed using a back injection process, during which the base wafer 10 is put in a mold, and injection material is provided on the surface on which the auxiliary lens has to be formed, for instance the back surface.

In an embodiment, the assembling step 120 may be performed after a step 112 of assembling the layer of low birefringence material 11 to an additional layer 14.

Step 120 may be performed after the step 110 of recording a holographic component on the layer 11 of low birefringence material, or before, for instance if the auxiliary lens 30 is of low birefringence and provides optical power and that the configuration of the holographic component has to take into account said optical power. In that case, the auxiliary lens 30 is part of the recording setup of the holographic component.

The method also comprises a step 130 of depositing at least one coating 16, such as for instance anti-reflection coating or hard multi-layer coating. The coating may be deposited on a main surface (i.e. front or back surface) of the base lens 10, either on the layer 11 of low birefringence material, or on an additional layer 14, if any. The step 130 can in that case be performed before recording the holographic component 20, or after this step.

Step 130 may also be performed after assembling the base lens 10 to the auxiliary lens 30, and it that case comprises depositing the coating 16 on either the front or back surface of the obtained lens 1.

According to an example, the base lens 10 may comprise an anti-reflection coating 16 deposited before the recording of the holographic component 20 so as to improve the recording by removing any ghost reflection. As step 111 of recording the holographic material is preferably performed at 80° C., an anti-reflection coating able to withstand this temperature is preferably selected. According to another example, a Hard Multi-layer Coating may be provided after the recording of the holographic component since the deposition process of an HMC requires a step of heating at about 100-120° C. and such temperature is withstood by a holographic component.

According to another example, a Hard Multi-Layer Coating and/or anti reflection coating may be deposited on either a front surface or a back surface of the lens obtained after assembling the base lens 10 to the auxiliary lens 30.

In FIG. 6 is shown a non-limiting, exemplary implementation of the method, which comprises the step 110 of forming the holographic component 20 on the layer 11 of low birefringence material, assembling 112 said layer to an additional layer 14 incorporating an optical function, then assembling 120 the base lens thus obtained to an auxiliary lens, and finally depositing 130 at least one coating 16 on the thus obtained ophthalmic lens.

A final lens is obtained, comprising a high quality holographic component 20 since it has been recorded on a layer 11 of low-birefringence material and any suitable optical function which may be provided either by the base lens or by the auxiliary lens.

What is claimed is:

1. An ophthalmic lens, comprising:
   a base lens comprising at least a layer of low-birefringence material and at least one holographic component recorded on a surface of the layer of low-birefringence material; and
   an auxiliary lens assembled to the base lens, wherein the base lens comprises a polarizing cell formed by two layers of low-birefringence material between which is interposed a polarizing film, and the layer of low-birefringence material on which is recorded the holographic component is one of the two layers of low-birefringence of the polarizing cell.

2. The ophthalmic lens according to claim 1, wherein the auxiliary lens is made of high-birefringence material.

3. The ophthalmic lens according to claim 1, wherein the ophthalmic lens has an optical power, the layer of low-birefringence material has no optical power and at least part of the optical power is provided by the auxiliary lens.

4. The ophthalmic lens according to claim 1, wherein the base lens and/or the auxiliary lens is designed to provide an optical function chosen among the following group: amplitude filtering function, spectral filtering function, polarization function.

5. The ophthalmic lens according to claim 4, wherein the base lens includes one of a polarization function, a photochromic or electrochromic cell or a tinted layer, and the holographic component is located on a back surface of the base lens.

6. The ophthalmic lens according to claim 1, wherein the base lens has a front and a back surface, said back surface being formed by a back surface of the layer of low-birefringence material, and the front surface of the base lens is covered with a hard multi-layer coating.

7. The ophthalmic lens according to claim 1, wherein the holographic component is chosen among the group consisting of:
a holographic mirror,
a holographic filter,
a holographic lens,
a holographic deflector,
a Fourier hologram,
an edge-lite hologram.

8. A method of manufacturing an ophthalmic lens that includes a base lens and an auxiliary lens, the method comprising:
depositing a film of unrecorded holographic medium on a surface of a layer of low-birefringence material;
performing holographic recording of said holographic medium by generating interferences between a reference beam and an illumination beam, so as to form a holographic component on said layer of low-birefringence material; and
assembling the layer of low birefringence material to the auxiliary lens, said assembling being performed after or before the performing of the holographic recording, wherein
the base lens comprises a polarizing cell formed by two layers of low-birefringence material between which is interposed a polarizing film, and
the layer of low-birefringence material on which is recorded the holographic component is one of the two layers of low-birefringence of the polarizing cell.

9. The method according to claim 8, wherein, during the holographic recording, at least one of the reference beam and the illumination beam propagates through the layer of low-birefringence material before reaching the holographic medium.

10. The method according to claim 8, further comprising thermoforming the layer of low-birefringence material before performing the holographic recording, said thermoforming implemented to achieve a desired curvature.

11. The method according to claim 8, wherein the assembling of the layer of low birefringence material to the auxiliary lens is performed by additive manufacturing, gluing, casting, clipping or injection.

12. The method according to claim 8, further comprising assembling at least one additional layer to the layer of low birefringence material, before or after the holographic recording, the additional layer providing an optical function.

13. The method according to claim 8, further comprising depositing at least one coating comprising a hard multi-layer coating and/or an anti-abrasion coating on a front and/or back surface of the lens obtained by assembling the layer of low birefringence material to the auxiliary lens, or on the base lens comprising the layer of low birefringence material before its assembling to the auxiliary lens.

* * * * *